No. 632,348. Patented Sept. 5, 1899.
F. E. HANSEN.
SUPPORT OR HOLDER FOR DISH COVERS.
(Application filed Dec. 22, 1898.)
(No Model.) 2 Sheets—Sheet 1.
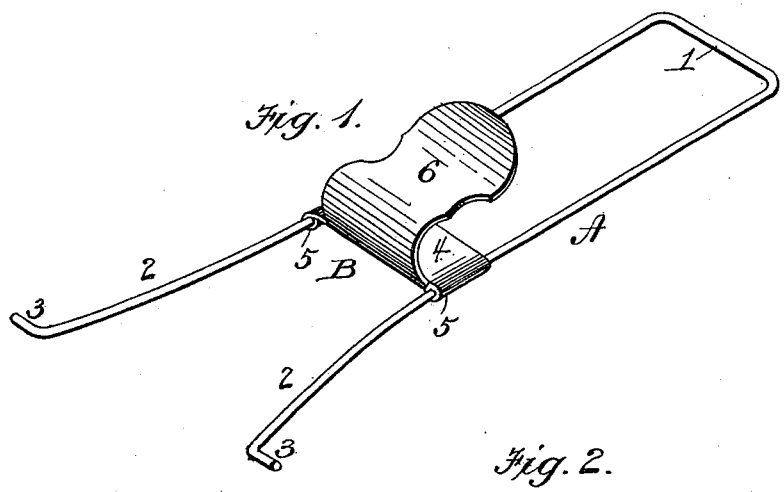
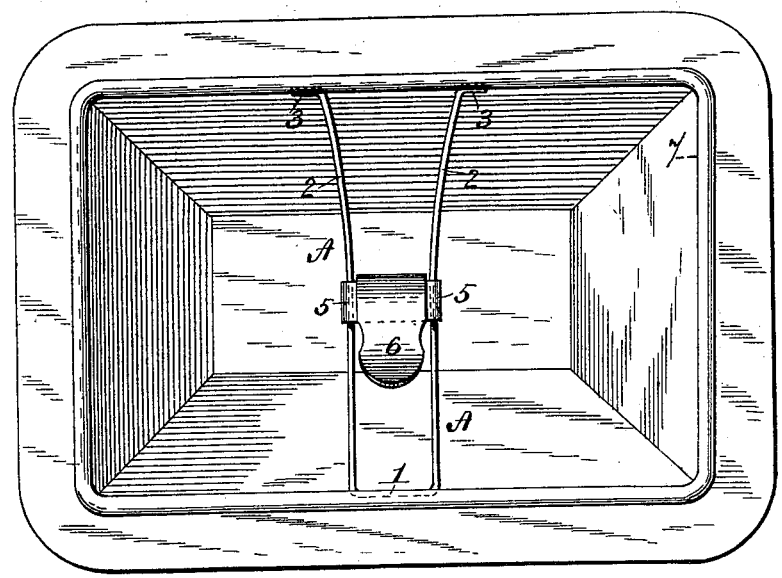
WITNESSES:
Franck L. Durand
A. G. Heylmun
INVENTOR
Florian E. Hansen
BY
J. M. Yznaga
ATTORNEY.

No. 632,348. Patented Sept. 5, 1899.
F. E. HANSÈN.
SUPPORT OR HOLDER FOR DISH COVERS.
(Application filed Dec. 22, 1898.)
(No Model.) 2 Sheets—Sheet 2.

WITNESSES:
Franck L. Ourand.
A. G. Huylmun.

INVENTOR
Florian E. Hansen
BY
J. M. Yznaga,
ATTORNEY.

UNITED STATES PATENT OFFICE.

FLORIAN E. HANSEN, OF MINNEAPOLIS, MINNESOTA.

SUPPORT OR HOLDER FOR DISH-COVERS.

SPECIFICATION forming part of Letters Patent No. 632,348, dated September 5, 1899.

Application filed December 22, 1898. Serial No. 700,041. (No model.)

*To all whom it may concern:*

Be it known that I, FLORIAN E. HANSEN, a citizen of the United States of America, residing at Minneapolis, in the county of Hennepin and State of Minnesota, have invented certain new and useful Improvements in Supports or Holders for Dish-Covers; and I do hereby declare the following to be a full, clear, and exact description of the invention, such as will enable others skilled in the art to which it appertains to make and use the same.

My invention has relation to improvements in supports and holders for dish-covers; and the objects are to provide a cheap, certain, and efficient holder for the cover of a table-dish when in use on the table whereby the cover or lid of a dish may be moved from over the dish and its contents and held from slipping or falling down on the table-cover to mar the cloth, to obviate the complete removal of the cover or lid and its disposition to a place or position remote from the dish, and to provide a holder for a dish cover or lid applicable to any cover and which may be permanently or detachably secured to the lid for sustaining and supporting the lid or cover when removed to afford access to the interior of the dish.

I have fully and clearly illustrated the invention in the accompanying drawings, wherein—

Figure 4:
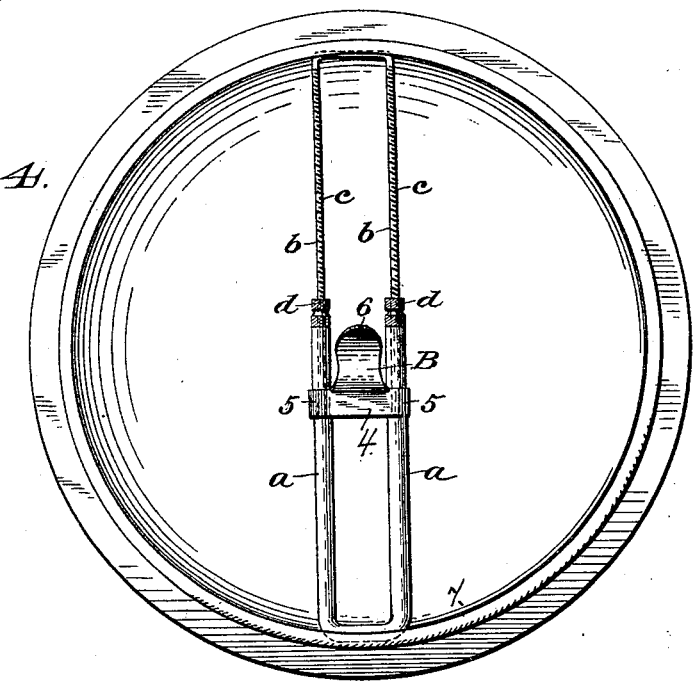
Figure 5:
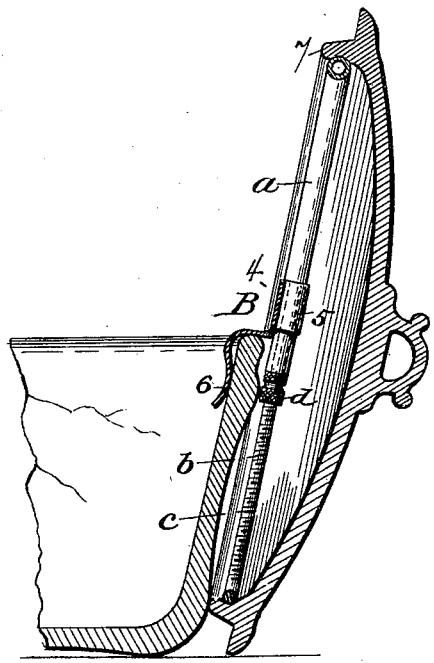

Figure 1 is a perspective of a spring holding frame or bracket with an adjustable sliding support arranged thereon. Fig. 2 is plan view of the spring holding-frame with the support thereon arranged in the lid or cover of a dish. Fig. 3 is a perspective of the holding-frame made telescopically extensible and the support slidingly arranged thereon and threaded nuts to adjust, press, and hold the frame in a cover or lid. Fig. 4 shows the device illustrated in Fig. 3 arranged in position in a dish lid or cover. Fig. 5 shows a cover or lid of a dish partly moved from a dish and arranged in position and so held by the holder.

A designates the frame of the device, composed of a spring-metal frame or bracket made of a bar of suitable size bent into loop or U shape, with the bars separated by a straight or curved portion 1, from which the arms or bars extend substantially parallel with each other for a distance and then flared outward, as at 2, to the ends, substantially as shown, and terminating in outwardly directed or turned lugs or feet 3 3. On the bars of this bracket or frame is slidingly disposed the holder B, consisting of a single piece of metal the cross-bar or end piece 4 of which is formed with sleeves or eyes 5, which take slidingly on the bars of the frame and may be adjusted and moved to any desired or required position on the bars of the frame, the outward spring tension of the bars of the frame holding it in any position to which moved. On the cross-bar or end piece of the holder B is formed a tongue or projection 6, which is adapted to engage against or over the rim or edge of a dish when the frame is secured in the under side of a dish-cover, as indicated in the drawings, and the cover is moved off to one side and hold the cover from further slipping off when caused to assume an inclined on perpendicular position, as shown in Fig. 5 of the drawings. This form of frame is adapted to either round or square dish-covers. When applied to round covers, the spring-arms of the frame are compressed until the frame can be inserted or placed in the lid, with the head or cross-bar lodged against the inner side or face of the usual depending flange 7 of the lid and the free ends of the spring-arms of the frame within and against the said flange at the opposite side of the cover, as indicated in the drawings in Fig. 2, and then by moving the holder B back on the arms of the frame they will automatically move or spread outward and bear with their ends against the flange with a force sufficient to lock the frame in the lid. The holder B may then be adjusted on the frame to suit the incline to which the lid may assume when removed, as intended, from over the dish. When the frame is applied to a square lid, it is put in with the arms spread or extended, and then by moving the sliding holder forward toward the free ends of the frame the arms are made to move inward and engage the flange on the lid and lock the frame fast in position.

In Figs. 3 and 4 of the drawings is illustrated a modified form of frame to which the holder is operatively applied. In this construction the frame is composed of two interengaging and telescoping loops or frames *a b*, the legs or bars of the frame *b* sliding within the tubular legs or bars *a* of the other part of the frame and provided with screw-threads *c*, on which engage adjusting and clamping nuts *d d*, so that when the frame is placed within the lid or cover of a dish and extended until the respective ends are lodged against the flange of the cover, as shown, these adjusting and clamping nuts may be screwed up against the ends of the bars of the frame *a* and the frame clamped in position and so held in the cover. The construction of the holder B on this frame is identical with that already described and its arrangement and disposition similar to that heretofore specified.

Having thus described my invention, what I claim, and desire to secure by Letters Patent, is—

1. A dish-cover holder comprising a U-shaped metal frame adapted to be secured in a lid or cover of a dish, and a holder mounted upon both limbs of said U-shaped frame and adapted to engage the rim or edge of a dish, substantially as described.

2. A dish-cover holder comprising a metal frame adapted to be secured in the lid or cover of a dish, and a sliding plate formed with a downward-projecting tongue arranged on the frame, substantially as described.

3. A dish-cover holder consisting of an extensible frame adapted to be secured in the lid or cover of a dish, a holder slidingly arranged on the frame and formed with a tongue or projection to engage the edge or rim of a dish, and clamping and adjusting nuts to clamp the frame in the lid, substantially as described.

In testimony whereof I affix my signature in presence of two witnesses.

FLORIAN E. HANSEN.

Witnesses:
GUY L. CALDWELL,
J. L. DOBBIN.